May 7, 1940.  W. N. OTT  2,199,443

POWER-DRIVEN IMPULSING MECHANISM

Filed July 23, 1938   8 Sheets-Sheet 1

Fig. 1

INVENTOR
William N. Ott
BY
A. D. T. Libby
ATTORNEY

May 7, 1940.  W. N. OTT  2,199,443
POWER-DRIVEN IMPULSING MECHANISM
Filed July 23, 1938   8 Sheets-Sheet 2

INVENTOR
William N. Ott
BY
A. D. T. Libby
ATTORNEY

May 7, 1940.　　　W. N. OTT　　　2,199,443
POWER-DRIVEN IMPULSING MECHANISM
Filed July 23, 1938　　8 Sheets-Sheet 3

INVENTOR
William N. Ott
BY
A. D. T. Libby
ATTORNEY

May 7, 1940.                    W. N. OTT                    2,199,443
                    POWER-DRIVEN IMPULSING MECHANISM
                Filed July 23, 1938          8 Sheets-Sheet 4

INVENTOR
William N. Ott
BY
A. D. J. Libby
ATTORNEY

May 7, 1940.  W. N. OTT  2,199,443
POWER-DRIVEN IMPULSING MECHANISM
Filed July 23, 1938   8 Sheets-Sheet 5

Fig. 10

INVENTOR.
William N. Ott
BY A. D. T. Libby
ATTORNEY.

May 7, 1940.  W. N. OTT  2,199,443
POWER-DRIVEN IMPULSING MECHANISM
Filed July 23, 1938  8 Sheets-Sheet 7

Fig. 13

INVENTOR.
William N. Ott
BY A. D. T. Libby
ATTORNEY.

May 7, 1940.  W. N. OTT  2,199,443
POWER-DRIVEN IMPULSING MECHANISM
Filed July 23, 1938  8 Sheets-Sheet 8

INVENTOR.
William N. Ott
BY
A. D. T. Libby
ATTORNEY.

Patented May 7, 1940

2,199,443

UNITED STATES PATENT OFFICE 2,199,443

POWER-DRIVEN IMPULSING MECHANISM

William N. Ott, Newark, N. J.

Application July 23, 1938, Serial No. 220,914

23 Claims. (Cl. 179—90)

This invention relates to power-driven impulsing mechanism for sending impulses or signals to be utilized in the operation and control of electrical apparatus.

In order to describe the principles of my invention, I have chosen, by way of illustration but not of limitation, to show its applicability to a call system of the telephone type.

Almost every user of a telephone has certain numbers that are very frequently called during the course of a day, and where the dial system is used much time is consumed, including mistakes which may be made, in dialing these calls, especially where seven digits are used, as is very frequently the case.

It is therefore the principal object of my invention to provide a mechanism which can be connected to any subscriber's line and which is so constructed and arranged that a series of frequently called numbers may be permanently set up in the mechanism, so that the subscriber merely has to throw one key or push a button and the said mechanism will automatically, rapidly and correctly dial the desired number. The addition of this mechanism does not interfere with the usual manual dialing of the phone.

There are many other ancillary objects which will occur to one skilled in this art after a study of the specification, taken in connection with the annexed drawings, wherein:

Referring now to the details, wherein like numbers refer to corresponding parts in the various views, 10 is the base of a casing support member in which a small high-speed motor 11 is mounted. The motor 11 is preferably adapted to run on either A. C. or D. C. current and is provided with a suitable gear reduction within the housing 12, so that the shaft 13, coming from the motor structure, turns at approximately 250 R. P. M.

Figure 9:
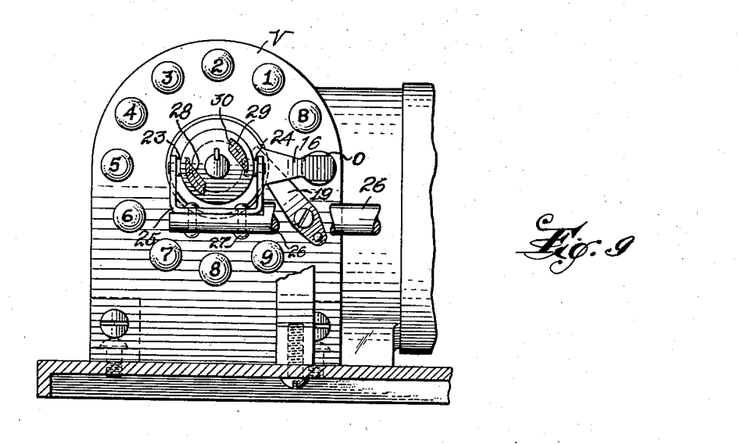
Figure 9 is a view on the line 9—9 of Figure 1.

Mounted on the support 10, as by brackets 14 and 15, and adjacent the motor 11 and concentric with the shaft 13, is a digit value selector V having arcuately arranged contacts 0, B (indicating blank), and 1 to 9 inclusive (Figure 9). These contacts are adapted to be engaged by a contact arm 16 that is fastened to a metal disc 17 carried on an insulating sleeve 17a fixed to the shaft 13 in any satisfactory manner as by a set screw 18, current being conveyed to the arm 16 by a contact member 19 supported on the insulator comprising the framework of the value selector V.

Figure 1:
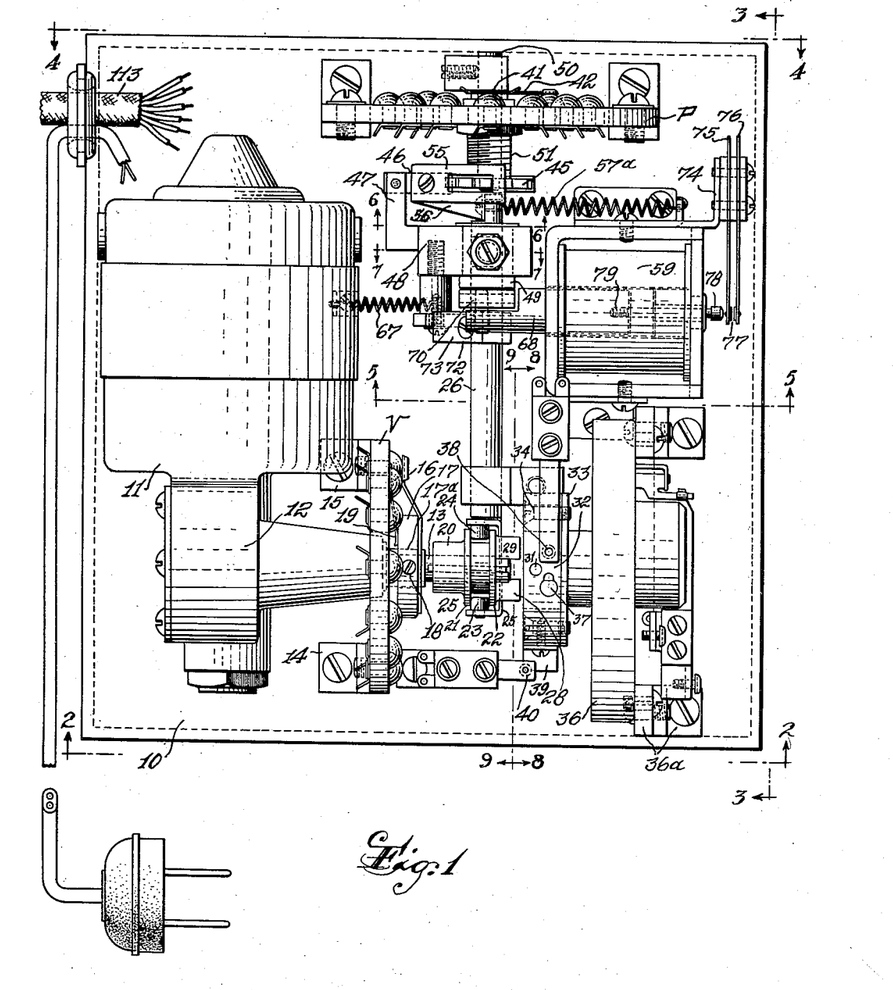
Figure 1 is a plan view of the sending apparatus.

On the outer end of the shaft 13 is mounted a clutch member 20 which is adapted to slide longitudinally on the shaft 13, but is keyed thereto so as to rotate with the shaft. The clutch 20 is provided with a pair of spaced annular flanges 21 and 22, between which studs 23 and 24 are positioned. These studs are carried on a U-shaped bracket 25 which is fastened to a cross-shaft 26 in any satisfactory manner as by rivets 27 (Figure 9). The clutch member 20 has projecting lugs 28 and 29 which are preferably provided with flat surfaces 30 adapted—when the clutch 20 is moved to the right from the position shown in Figure 1, to engaging position—to engage a pin 31 carried by a disc 32 preferably of insulating material.

The disc 32 is fastened to a plate 33 as by screws 34. The plate 33 is connected to a stub shaft 35 (see Figure 8) which is supported by a dialing structure 36, carried on the base member 10 by a suitable insulating support bracket 36a, for sending out the impulses as will be later referred to. The disc 32 also carries a knob 37 for closing a contact 38 as will be hereinafter described; also a contact-closing member 39 closing a contact 40 for a purpose to be later described.

Mounted on a separate stub shaft 50 which is carried by a bushing 51, is a contact arm 41 adapted to engage oppositely disposed contacts 1—1; to 7—7; inclusive of a digit-positioning selector P. The contact arm 41 has a supplemental arm 42 adapted to engage contacts 43 and 44, the purpose of which will be later described.

Figures 7, 8:
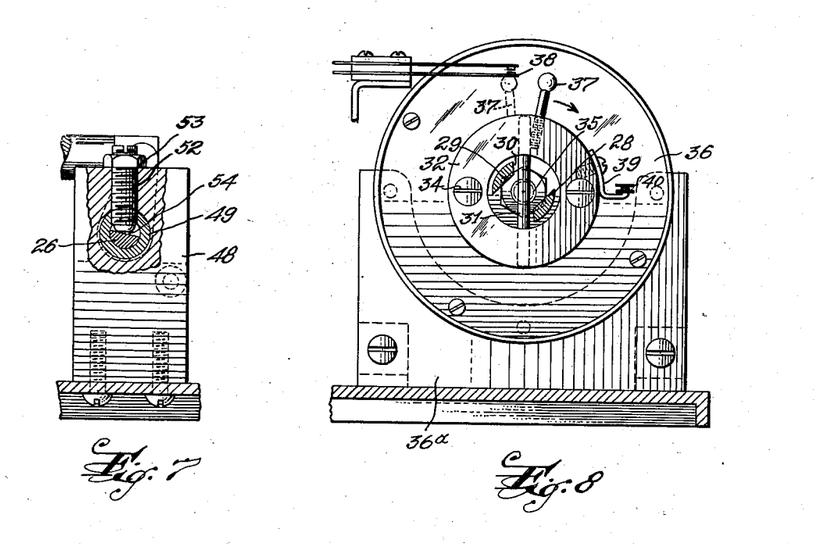
Figure 7 is a view on the line 7—7 of Figure 1.
Figure 8 is a view on the line 8—8 of Figure 1.

Also mounted on the stub shaft 50, for rotation therewith, and adjacent the digit positioner P, is a ratchet wheel 45. Associated with the ratchet wheel 45 is a spring stop 46 carried by a bracket 47 supported by a member 48 which carries a bushing 49 (see Figure 7) that acts as a bearing for the shaft 26. The shaft 26, where it is positioned in the bushing 49, has a flattened surface as indicated in Figure 7 for cooperation with the end of an adjustable screw 52 which is locked in position by a lock nut 53. The end 54 of the screw 52 is formed so as to allow, with the adjustment provided, the shaft 26 to turn only through a definite angle for a purpose to be hereinafter pointed out.

Figures 5, 6:
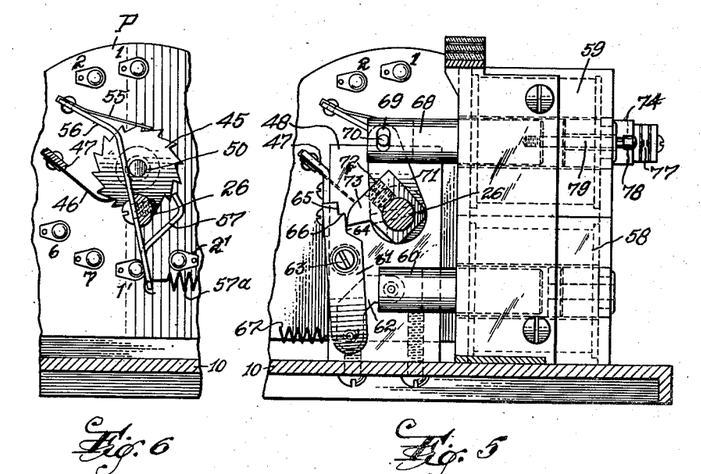
Figure 5 is a view on the line 5—5 of Figure 1.
Figure 6 is a view on the line 6—6 of Figure 1.

Associated with the ratchet wheel 45 (Figure 6) is a pawl 55 carried on the end of an arm 56 which is fastened to the shaft 26. The arm 56 has a lug 57 preferably formed integral therewith and which acts on the ratchet wheel 45 to prevent an overthrow of the shaft 50, so that the contact member 41 will always stop on the proper contact. A spring 57a acts on the end of the arm 56 to hold the parts in the position indicated in Figure 6 and to turn the shaft 26 as will be hereinafter pointed out.

Figure 2:
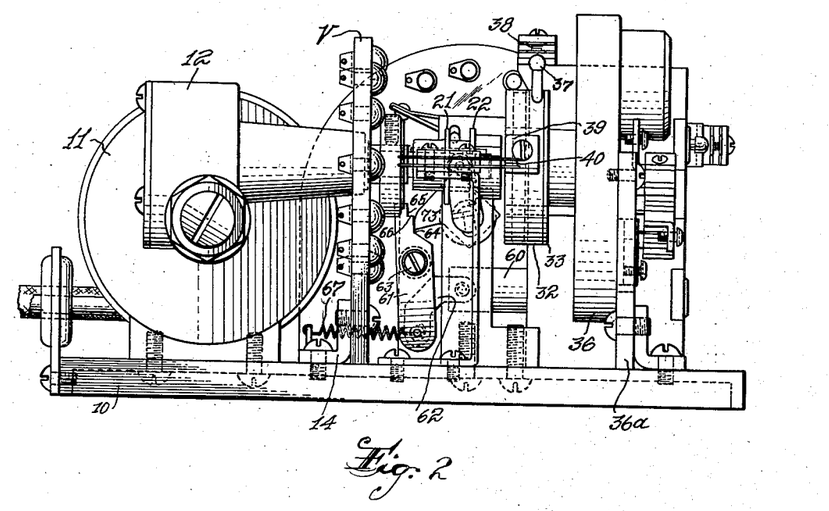
Figure 2 is a view on the line 2—2 of Figure 1.

Mounted on the support member 10, are a pair of solenoid magnets 58 and 59. The solenoid plunger 60 of the magnet 58 is attached to a stop member 61 through the medium of a link 62, the link 62 being pivoted to both the plunger and the stop member (see Figures 2 and 5). The stop member 61 is rotatably mounted on a pivot 63 and its free end is provided with two step surfaces 64 and 65. Between the step surfaces 64 and 65 is a seat 66, the purpose of which will be later described. A spring 67 is used to hold the member 61 in the position indicated in Figure 5.

The magnet 59 has a solenoid plunger 68 having a cross-slot 69 therein to receive a pin 70 which is carried by an arm 71 fastened to the shaft 26. Adjustably mounted on the shaft 26, adjacent the arm 71, through the medium of a set screw 72, is a dog 73 which is adapted to function with the member 61 in a manner which will be hereinafter described.

Carried on the framework of the magnet 59 is a bracket 74 which supports, through suitable insulators, contact springs 75 and 76 which carry points to make a contact 77 which is controlled by an insulator 78 carried on the end of a pin 79 screw-threaded into the end of the plunger 68.

Key-box

Figure 10:
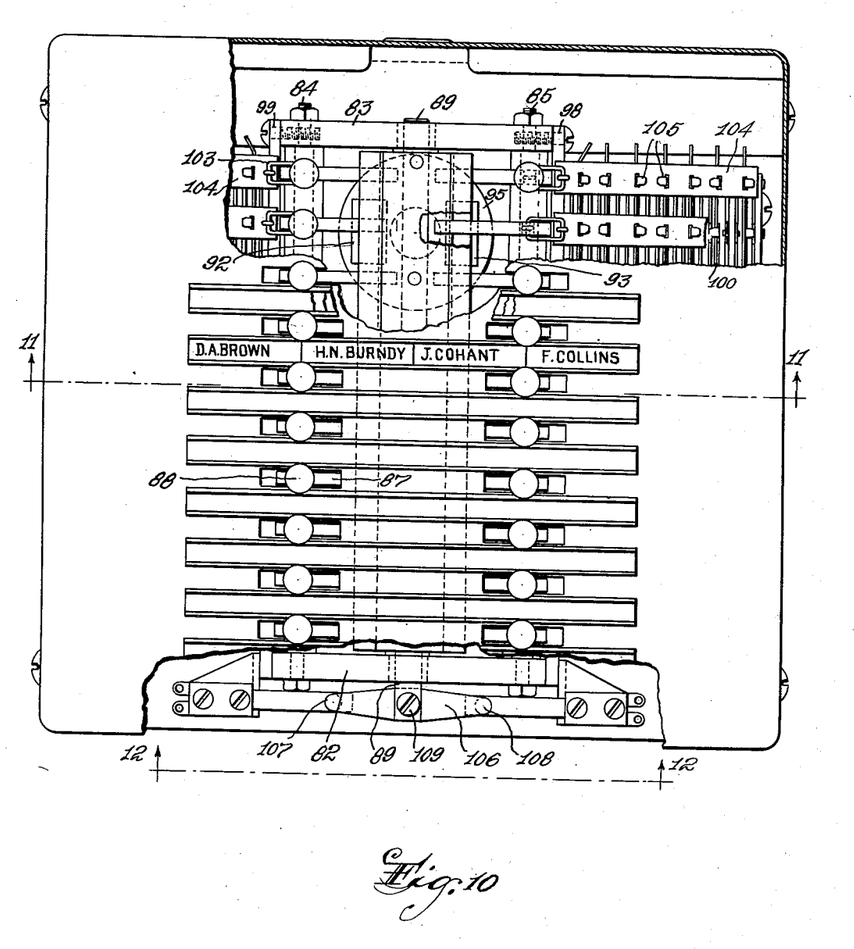
Figure 10 is a plan view of the key-box part of the mechanism, the parts being broken away to show certain interior constructions.
Figure 11:
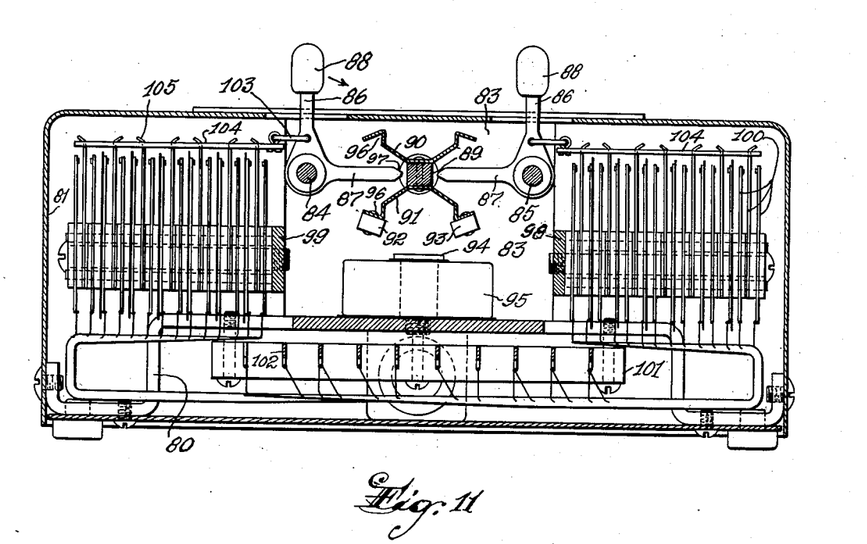
Figure 11 is a view on the line 11—11 of Figure 10.

The key-box and associated parts which are illustrated in Figures 10 to 13 inclusive comprise a base 80 and a cover 81. Mounted on the base 80 are two end support members 82 and 83. Between the support members 82 and 83 are supported a pair of rods 84 and 85 which support a plurality of key levers having arms 86 and 87. The arms 86 are provided with handles 88 for operation of the keys. Also carried by the supports 82 and 83 is a rotatable shaft 89. Intermediate the support members 82 and 83 the shaft 89 is rectangular in shape, and on opposite sides thereof are mounted two strips 90 and 91 similarly formed as shown in Figure 11, but to the extremity of the strip 91 are mounted two pieces 92 and 93 of magnetizable material which are adapted to be attracted by the core 94 of a magnet 95 in a manner to be hereinafter described.

The free ends of the arms or members 90 and 91 are formed somewhat V-shaped, as indicated at 96, to receive the ends 97 of the lever arms 87 which are adapted to engage the seats 96, whereby the keys, when they are thrown either to the right or left, will be locked in position by the ends 97 engaging the seats 96, thereby holding the shaft 89 in the position in which it has been rotated by the operation of one of the keys. The operation of these members will be later described. The support members 82 and 83 also support, on opposite sides thereof, members 98 and 99 which support insulators carrying a plurality of springs generally referred to as 100.

Figure 12:
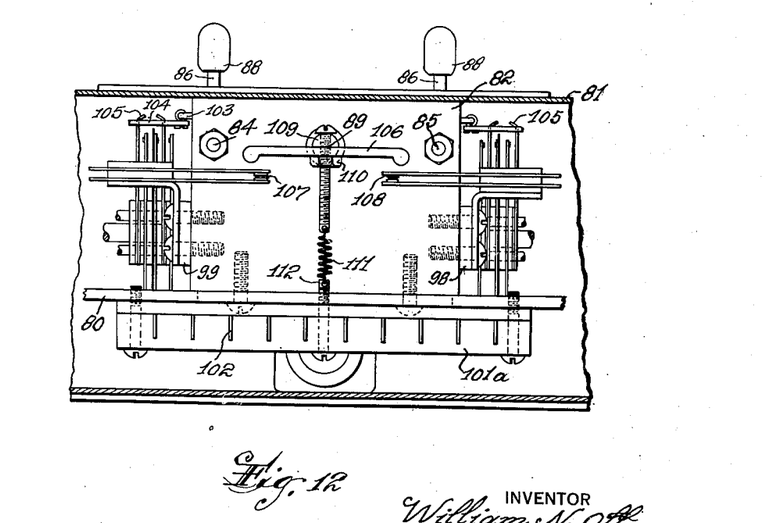
Figure 12 is a view on the line 12—12 of Figure 10.
Figure 13:
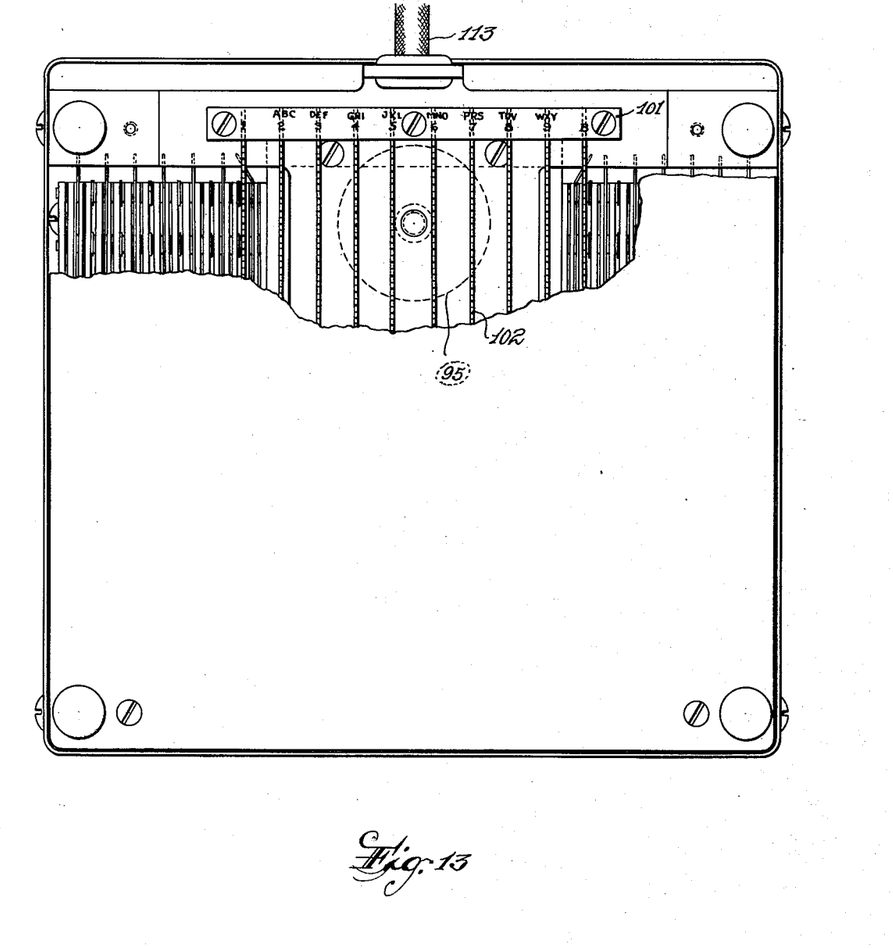
Figure 13 is a bottom view of the key-box shown in Figure 10, a portion being broken away to show the interior parts.

At opposite ends of the box are mounted two insulating strips 101 and 101a, shown in Figures 11 and 12. These insulating strips carry bus bars 102, to which are electrically connected the contact springs 100 in the order desired, to which reference will be later made.

Each arm 86 of the keys is connected through a link 103 to an insulating strip 104 which is perforated to receive the ends of the lever springs 105, all of which, that are attached to the arm 86, are actuated by its key or handle 88.

The shaft 89 carries at one end a lever 106 preferably of insulating material and which is adapted to close contacts 107 and 108. The bar 106 is fastened to the shaft 89 in any satisfactory manner as by a screw 109 and lock nut 110. The screw 109 is extended, and to the end thereof is attached a spring 111 which is attached to a screw 112 which may be adjustable to change the tension of the spring 111, which spring acts to return the shaft 89 to normal position after the magnet 95 acts upon either one of the armatures 92 or 93 in the manner to be hereinafter described.

Associated with the key-handles 88, is a designation strip as indicated in Figure 10, on which the parties that are to be frequently called are designated. For example, if it is desired to call the party Brown, the corresponding key-handle 88 is thrown to the left, and if the party Burndy is to be called, the key-handle is thrown to the right.

Operation

Figures 14, 15:
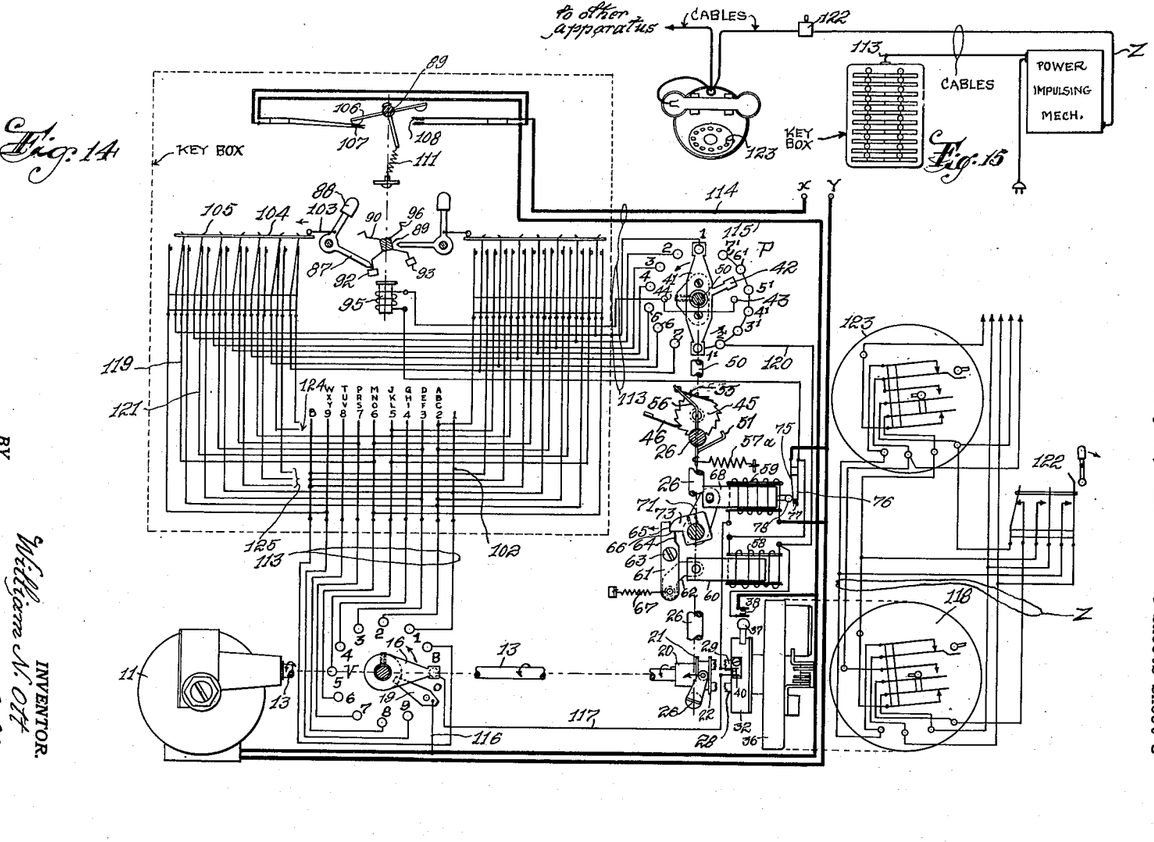
Figure 14 is a circuit diagram of the impulsing mechanism as applied to a telephone line.
Figure 15 is a general system plan of the diagram shown in Figure 14.

Coming now to the operation of my mechanism, and referring to Figures 14 and 15, let it be assumed that the party Burndy, whose number is MI-3-7500, is to be called, then the key 88 will be thrown to the right as indicated in Figure 14.

It will be seen, from Figure 14, that the bus bars 102 are connected through a suitable cable 113 to the proper contacts of the value selector V, and the contacts, closed by the lever springs 105, are connected to the contacts on the digit positioner P. On throwing the key-handle 88 to call the party Burndy, the contact 107 is closed and current then passes from a suitable source of power, the terminals of which are marked, for convenience, as X and Y, through the conductor 114 to the contact 107, the conductor 115 through the motor 11, and back to the other terminal Y. It will be noted that the key 88 is locked in position through the medium of the engaging portions 96 and 97 as heretofore described. The armature 92 is then positioned in a manner to be acted upon by the magnet 95 in a subsequent step to be described, to break this lock and allow the switch key and associated parts to return to normal position.

As soon as the shaft 13 is started into rotation by the motor 11, the contact arm or brush 16 starts to rotate and if it is not already on the contact marked 0, then as soon as it does engage this contact, a circuit is closed through the wire 116 and contact member 19 to the arm 16, and through the wire 117 and contact 40 through the electro-magnet 59, to the other side of the source of power. The electro-magnet is immediately actuated, drawing the plunger 68 inwardly and closing the contact 77, and at the same time, through the arm 71, turning the shaft 26 and the dog 73, lifting it from the step 64 to the step 65, onto the seat 66.

The turning of the shaft 26 as above indicated moves the clutch 20 through the medium of the studs 23 and 24 and the bracket 25 fastened to the shaft 26, into engagement with the cooperating clutch member 32, this engagement being made as heretofore described. Since the clutch member 20 is being rotated by the shaft 13, the member 32 is at once started turning, and since the member 32 is connected to the stub shaft 35 which operates the pulsing contacts on the sending device 118. Since the contact brush 16 is set into rotation as described, in the direction of the arrow, when it reaches the contact 6, which corresponds to M of the Burndy number, then the circuit will be closed through wire 116, contact member 19 and brush 16, contact 6 of the value selector and the bus bar M—N—O—6 and connector 119, to its cooperative lever spring 105 and from thence to contact 1 on the digit positioner P. At this instant the switch arm 41 of P is in a position as indicated in Figure 14, and current will then flow through the wire 120, through the magnet 58, through the contact 77 which is closed as heretofore described, to the other side of the circuit. The magnet 58 draws in its plunger 60 and this in turn actuates the member 61 through the link 62, causing the member 61 to pivot about its pivot 63, releasing it from its position under the dog 73.

Immediately the dog 73 is released, the spring 57a rotates the shaft 26, as has been described, causing the shaft 26 to release the clutch 20 and allow the member 32 to return, under the influence of the impulsing mechanism, to its normal position through the stub shaft 35, thus sending out the six impulses from the impulsing mechanism within the casing 36 and schematically illustrated by 118. The rotation of the shaft 26 by the spring 57a, as just described, causes the parts shown in Figure 6 to move the ratchet wheel 45 one tooth, and since the ratchet wheel 45 is on the shaft 50 which carries the contact member 41, this member 41 will be moved up one step to the position 2—2'.

When the member 32 returns to normal position, as more clearly shown in Figure 8, the contact 40 is closed and the apparatus is ready to send the next impulse.

When the contact brush 16 next engages the zero contact on V, the clutch 20 is engaged as heretofore described, and likewise the solenoid relay 59 is actuated, and when the brush 16 reaches the contact 4, a circuit is completed through the bus bar G—H—I—4 and connector 121, through its cooperative lever 105 which is connected to the contact 2 of P, the brush 41 now being connected across 2—2' and the circuit completed through solenoid 58 in the manner heretofore described, and the four impulses will then be produced by the impulsing mechanism which will be restored after the four impulses have been sent in the manner as heretofore described for M. The digits 3, 7, 5 of Mi–3–7500 will be impulsed in a similar manner.

The sixth digit, 0, is dialed in a somewhat different manner. For example, as the contact brush 16 is rotated and reaches the zero contact, the solenoid magnet 59 is operated as before, but the member 32, however, is now rotated to the full limit of its stroke. indicated by the dotted position of the member 37 in Figure 8, in which position the contact 38 is closed. The closure of the contact 38 actuates the trip magnet 58 and releases the clutch 20, and at the same time allows the impulsing mechanism to send out ten pulses corresponding to an 0. The seventh digit, 0, is dialed in the same manner as the sixth digit.

On closure of the contact 38, the trip relay 58 is actuated as before and the clutch 20 is released and the impulsing operation is started. Simultaneously, with the closure of the contact 38, a circuit is completed through the magnet 95 and the contact 44 as the arm 42 at this instant is on the contact 44. This momentary actuation of the magnet 95 attracts the armature 92 and releases the lock on the lever arm 87, allowing the key 88 to return to normal position and likewise the lever springs 105. The action of the spring 57a on the ratchet wheel 45 moves the contact member 41 of the contact 7—7' to a position 180° from that shown in Figure 14, in which position it is ready to receive a new number. The unlocking of the key 88 allows the springs 105 to be returned to normal position, and the spring 111 will restore the lever 106 to its normal position, opening the contact 107, stopping the motor and restoring the apparatus to idle position.

As shown diagrammatically at the right-hand side of Figure 14, a cutout switch 122 is indicated for the purpose of cutting out the impulsing mechanism 118 if desired or necessary. Since the contact 38 (see Figure 8) is utilized in connection with the dialing of the number 0, it is not necessary to connect the springs corresponding to the last two digits of the telephone number to the bus bars 102, as indicated at 124 and 125.

An important use and advantage of the contact 38 may be referred to as follows: Suppose, for example, the digit 4 is being dialed and a momentary failure of power occurred at that instant, or a bad contact occurred between one of the switch levers 105 and its contact for the digit 4, the clutch release magnet would not be operated and the member 32 would be turned a full revolution and then would be locked, thereby stalling the motor with deleterious results. Keeping in mind that the closure of the contact 38 immediatly energizes the trip magnet, it will be seen that this safeguards the apparatus from such contingencies as mentioned.

Another important feature of my invention is the use of an intermediate contact B on the value selector V. This is utilized so that the same apparatus may be used in any system with less digits than seven. Thus, if a four-digit number is dialed, after the four numbers are dialed in the regular manner, the turning of the switch contact 16 will engage the contact B and there will be three connections attached to the corresponding bar 102, and due to these connections, the digit positioner P will be stepped up three additional steps after the four-digit number has been impulsed, thereby bringing the switch member 41 back to normal position. In this connection, it should be kept in mind that the spacing of the contact B between 0 and 1 on V is such that no impulse is sent out by the impulsing mechanism while the relays and P are being operated as just described.

Figure 3:
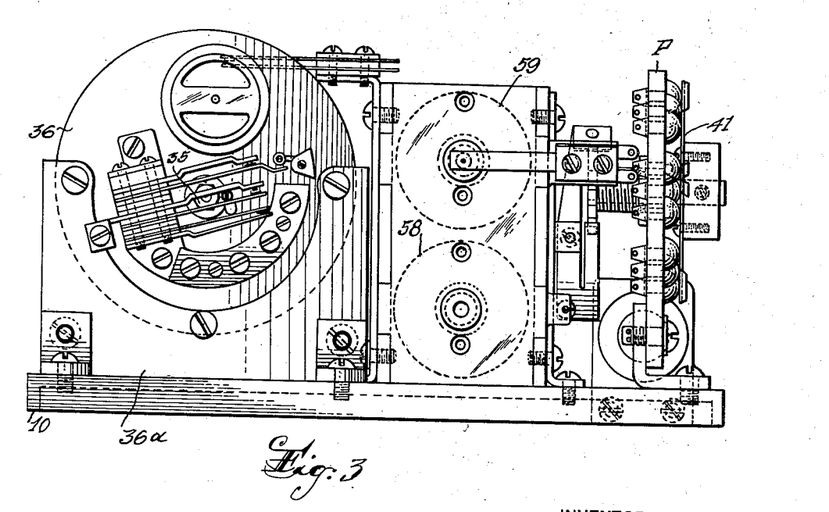
Figure 3 is a view on the line 3—3 of Figure 1.
Figure 4:
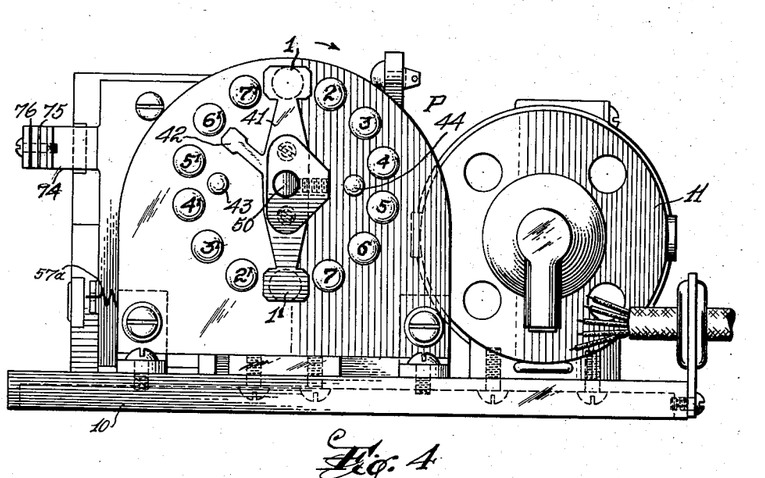
Figure 4 is a view on the line 4—4 of Figure 1.

No description has been given of the internal mechanism of the impulsing device 36 shown in the various figures, and especially in Figure 3, as this is of standard construction and in detail forms no part of my present invention.

It will be readily appreciated by one skilled in this art that the mechanical details for carrying my invention into practice may be varied over wide limits without departing from the spirit of my invention or the scope of the appended claims.

What I claim is:

1. Mechanism for sending out electrical impulses, including a motor having a driving shaft, a digit selector having a plurality of contacts and a switch arm operatively connected to said shaft for engaging said contacts as it is moved by the shaft; a key box carrying a plurality of keys and having bus bars connected to said contacts, a plurality of switch levers operatively connected to each key for simultaneous movement on operation of the key in a predetermined manner, contact members mounted to be engaged by said levers and connected in a chosen manner to said bus bars, means for locking the keys in a set position, means for releasing the lock after a set of impulses has been sent, means operated by any of the keys when set to impulsing position for closing a circuit through the motor and starting it and for applying current to said switch arm, a clutch member rotatably carried by said motor shaft, a clutch member rotatably mounted adjacent the first clutch member for cooperative engagement therewith, a current-impulsing device, said second clutch member being connected to said current-impulsing device, a cross-shaft operatively connected to one of said clutch members, means under control of said digit selector for turning said cross-shaft and causing the clutch members to engage at a predetermined time, means for locking said cross-shaft in clutching position until the proper digit is selected by the selector, electro-magnetic release means for said cross-shaft lock, a digit-positioning device having a movable contact member and stationary contacts engaged thereby, some of which are successively connected to said key levers and the others electrically connected to said electro-magnetic release means for sending current therethrough when the digit selector switch arm engages its proper digit contact connected to the desired key box member, means for restoring the cross-shaft and clutch members to normal position immediately after said release means is operated, and means for stepping up one step the movable contact member of the digit positioner, ready for the next digit impulsing, and means for actuating said key-lock releasing means after the last digit is set up for impulsing, and means for then restoring the key and opening the motor circuit.

2. Mechanism for sending out electrical impulses as set forth in claim 1, further defined in that the means for releasing the key lock includes an electro-magnet and an armature carried by a member engaged by a part of the key structure, a circuit through said electro-magnet being activated by special contacts and a contact member moved with said movable contact member on the digit-positioner, said special contacts being connected into a circuit leading to at least the release means for said cross-shaft lock.

3. Mechanism for sending out electrical impulses as set forth in claim 1, further defined in that said selector switch arm is directly connected to said driving shaft and rotates therewith and as long as the motor runs.

4. Mechanism for sending out electrical impulses as set forth in claim 1, further defined in that the switch levers for one key are anchored to an insulating strip having attachment means to the key.

5. Mechanism for sending out electrical impulses as set for in claim 1, further defined in that each key has two arms, one being connected to an insulating strip to which said switch levers are attached, while the other arm is provided with means for forming a lock with another member, said member being movable and having a part shaped to form the other cooperating part of said key-lock, and an armature carried by said movable member and comprising part of said key-lock releasing means.

6. Mechanism for sending out electrical impulses as set forth in claim 1, further defined in that the keys on the key box are arranged in two parallel rows, each key having two arms angularly positioned and being adapted to be moved in two directions for impulsing two signal members, the lock for the keys including a movable bar extending longitudinally of the key box between the rows of keys and carrying two oppositely positioned members having their edges terminating in formations to form with an arm of a key a lock for the key, said locking key arm engaging with one of said edge formations when the key is moved in one direction, and engaging the other edge formation when the key is moved in the opposite direction, the other arm of each key being operatively connected to its group of switch levers.

7. Mechanism for sending out electrical impulses as set forth in claim 1, further defined in that the keys on the key box are arranged in two parallel rows, each key having two arms angularly positioned and being adapted to be moved in two directions for impulsing two signal members, the lock for the keys including a movable bar extending longitudinally of the key box between the rows of keys and carrying two oppositely positioned members having their edges terminating in formations to form with an arm of a key a lock for the key, said locking key arm engaging with one of said edge formations when the key is moved in one direction, and engaging the other edge formation when the key is moved in the opposite direction, the other arm of each key being operatively connected to its group of switch levers, the release means for the lock including magnet armatures carried on opposite edges of one of said oppositely positioned members, and a magnet for attracting these armatures according to which way said key is moved, the magnet being excited by a circuit established substantially at the release of the clutch.

8. Mechanism for sending out electrical impulses as set forth in claim 1, further defined in that the keys on the key box are arranged in two parallel rows, each key having two arms angularly positioned and being adapted to be moved in two directions for impulsing two signal members, the lock for the keys including a movable bar extending longitudinally of the key box between the rows of keys and carrying two oppositely positioned members having their edges terminating in formations to form with an arm of a key a lock for the key, said locking key arm engaging with one of said edge formations when the key is moved in one direction, and engaging the other edge formation when the key is moved in the opposite direction, the other arm of each key being operatively connected to its group of switch levers, the motor circuit controlling means comprising a switch member mounted for operation by said longitudinally extending bar, and two pairs of parallel-connecting switch contacts in the motor circuit, one pair being operated for one direction of movement of said bar, and the other pair being operated by the other direction of movement of the bar.

9. Mechanism for sending out electrical impulses as set forth in claim 1, further defined in that the clutch member on the motor shaft is slidable thereon and has a pair of spaced flanges, while the cross-shaft carries a bracket having studs oppositely positioned between said flanges, the said clutch member having axially extending, suitably formed lugs for engagement with the second clutch member, said second member having means to be engaged by said lugs when the first clutch member is slidably moved in a clutching direction, said second clutch member being operatively connected to an impulsing device.

10. Mechanism for sending out electrical impulses as set forth in claim 1, further defined in that said means under control of the selector for initially turning the cross-shaft includes an electro-magnet having an attractable member operatively connected to the cross-shaft, the electro-magnet being connected in and energized by a circuit set up by the selector through a normally closed contact controlled by that part of the clutch connected to the current-impulsing device.

11. Mechanism for sending out electrical impulses as set forth in claim 1, further defined in that said means under control of the selector for initially turning the cross-shaft includes an electro-magnet having an attractable member operatively connected to the cross-shaft, the electro-magnet being connected in and energized by a circuit set up by the selector through a normally closed contact controlled by that part of the clutch connected to the current-impulsing device, the clutch-controlled contact being opened immediately after the clutch parts are brought into engagement, but the attractable member being held in attracted position by said locking means, said locking means comprising a dog operatively connected to the cross-shaft, and a stop member comprising part of said electro-magnetic release means.

12. Mechanism for sending out electrical impulses as set forth in claim 1, further defined in that said means under control of the selector for initially turning the cross-shaft includes an electro-magnet having an attractable member operatively connected to the cross-shaft, the electro-magnet being connected in and energized by a circuit set up by the selector through a normally closed contact controlled by that part of the clutch connected to the current-impulsing device, the clutch-controlled contact being opened immediately after the clutch parts are brought into engagement, but the attractable member being held in attracted position by said locking means, said locking means comprising a dog operatively connected to the cross-shaft, and a stop member comprising part of said electro-magnetic release means, said release means including an electro-magnet having an attractable member operatively connected to said stop member having two step surfaces, the outer one of which acts as the holding surface for said dog in locked position.

13. Mechanism for sending out electrical impulses as set forth in claim 1, further defined in that adjustable means are provided for stopping the angular movement of the cross-shaft at a predetermined point, and means on the clutch member, which is directly connected to the impulsing device, for closing a contact when this predetermined point is reached, said contact controlling a circuit through the electro-magnetic release means of the cross-shaft lock.

14. Mechanism for sending out electrical impulses as set forth in claim 1, further defined in that said digit-positioning device includes; a plurality of successive and arcuately spaced contacts insulatingly mounted on a support, there being one for each digit of the number to be impulsed connected to said key levers, and an equal number of equally spaced and oppositely arranged contacts electrically connected together and to said electro-magnetic release means, a stub shaft carrying a contact member adapted to bridge two of said contacts oppositely disposed, a ratchet wheel also carried by said stub shaft, a pair of arcuately spaced supplemental insulated contacts on the support, an arm electrically connected to said contact member and adapted to alternately engage said supplemental contacts at the time the last digit position is reached by said contact member, said supplemental contacts being electrically connected together and to said key lock releasing means.

15. Mechanism for sending out electrical impulses as set forth in claim 1, further defined in that said digit-positioning device includes; a plurality of successive and arcuately spaced contacts insulatingly mounted on a support, there being one for each digit of the number to be impulsed connected to said key levers, and an equal number of equally spaced and oppositely arranged contacts electrically connected together and to said electro-magnetic release means, a stub shaft carrying a contact member adapted to bridge two of said contacts oppositely disposed, a ratchet wheel also carried by said stub shaft, a pair of arcuately spaced supplemental insulated contacts on the support, an arm electrically connected to said contact member and adapted to alternately engage said supplemental contacts at the time the last digit position is reached by said contact member, said supplemental contacts being electrically connected together and to said key lock releasing means, a pawl carried by said cross-shaft for turning the ratchet wheel on movement of the cross-shaft toward normal position, and means for turning the cross-shaft back to normal position after it has been released from an impulse movement, a stop for the ratchet wheel and means acting to prevent an overthrow of the stub shaft.

16. In combination with an impulsing device having a rotary member, a key box for selecting a number to be impulsed, an electric motor having a shaft extension, a digit value selector mounted adjacent the motor and having a switch arm carried by the motor shaft, the selector having contacts electrically connected to contact members in the key box, a digit positioner having contacts connected to switch levers in the key box in cooperative relation to said contact members, clutch parts adapted to connect said impulsing device to said motor shaft, means for bringing said clutch parts into clutching position, means for releasing the clutch parts after the rotary member of the impulsing device has been set to an impulsing position, and means for advancing the positioner a step at approximately the same time, and means in the key box for starting the motor and stopping it at the end of the digit-selecting period.

17. In the combination set forth in claim 16 further defined in that the numbers to be called are permanently connected to their respective contact members in the keybox, while the means for starting and stopping the motor are under the control of a signal key in the keybox, so the only operation required to call a number or send a signal is to merely throw a key to a designated position.

18. In combination with an impulsing device having a rotary member, an electric motor having a shaft extension, clutch members for connecting said shaft to said rotary member, a digit selector operated by said motor shaft, a digit positioner, means controlled by said digit selector for bringing said clutch members into clutching position, also for declutching said parts after a predetermined time and for operating the positioner, a key box having a plurality of keys, each key being operable in one direction to initiate a call for a station, and in another direction to initiate a call for another station and parts under control of the keys electrically interconnecting the selector and positioner and means in the key box actuated by the single movement of any key therein for acting on certain of said parts and starting the motor, locking the key in operating position and placing the key lock under control of a circuit completed after the last digit of the number being impulsed has been selected by the digit selector.

19. In the combination set forth in claim 18 further defined in that the key lock circuit is activated by special switch contacts carried by the positioner, the circuit therethrough being completed just before the positioner has completed its last step in a number impulsing cycle.

20. Mechanism for sending electrical impulses from an impulsing device, including an electric motor, a digit selector, a digit positioner, a key box having keys and members through which the selector and positioner are interconnecting, the keys being adapted to select a desired number to be impulsed, means interconnecting the motor, selector, positioner and impulsing device, any key of the key box, when thrown to impulsing position, acting to start the motor which in turn actuates the digit selector, the positioner and impulsing device, parts of the interconnecting means releasing the key at the end of the impulsing cycle.

21. In the combination set forth in claim 18 further characterized in that the digit selector is provided with an extra contact B and interconnected through the key box and digit positioner so the apparatus can be used to impulse numbers in any system having digits less in number than the maximum positions of the digit positioner.

22. In the combination set forth in claim 18 further characterized in that the digit selector is provided with an extra contact B and interconnected through the key box and digit positioner so the apparatus can be used to impulse numbers in any system having digits less in number than the maximum positions of the digit positioner, and the spacing between the contact B between 0 and 1 on the digit selector is such that no impulse is sent out by the impulsing device while the digit positioner is moving over the unrequired steps.

23. In the combination set forth in claim 18 further defined in that a trip magnet is provided for controlling the action of said clutch members, the clutch member connected to said rotary member of the impulse device being provided with means for closing a circuit through said trip magnet for declutching the clutch members when the first mentioned clutch member on the shaft is rotated for any reason approximately a whole revolution for the purposes described.

WILLIAM N. OTT.